United States Patent
Li et al.

(10) Patent No.: US 7,653,318 B2
(45) Date of Patent: Jan. 26, 2010

(54) PHOTONIC PHASE LOCKED LOOP DETECTOR/DISCRIMINATOR

(75) Inventors: Yifei Li, Norwood, PA (US); Samuel Goldwasser, Bala-Cynwyd, PA (US); Robert Fischl, Moorsetown, NJ (US); William D. Jemison, Easton, PA (US); David K. Yoo, Collingswood, NJ (US)

(73) Assignee: F&H Applied Science Associates, Inc., Mt. Laurel, NJ (US)

( * ) Notice: Subject to any disclaimer, the term of this patent is extended or adjusted under 35 U.S.C. 154(b) by 511 days.

(21) Appl. No.: 11/402,511

(22) Filed: Apr. 12, 2006

(65) Prior Publication Data

US 2006/0251420 A1    Nov. 9, 2006

(51) Int. Cl.
*H04B 10/148* (2006.01)
(52) U.S. Cl. .................. 398/209; 398/204
(58) Field of Classification Search ......... 398/203–204, 398/188, 209
See application file for complete search history.

(56) References Cited

U.S. PATENT DOCUMENTS 5,319,438 A * 6/1994 Kiasaleh ............... 398/203
6,654,401 B2   11/2003 Vieira et al.

FOREIGN PATENT DOCUMENTS

JP            409064732    *  3/1997

OTHER PUBLICATIONS

John G. Proakis *Digital Communications*, 4th ed., McGraw-Hill, New York, New York, 2001, pp. 159-230.
Ferrel Stremler, *Introduction to Communication Systems*, 3rd ed., Addison-Wesley, New York, New York, 1992, pp. 261-303.
Yifei Li; Amarildo J. C. Vieira, Samuel L. Goldwasser and Peter R. Herczfeld, "Rapidly Tunable Millimeter-Wave Optical Transmitter for Lidar-Radar," IEEE Transactions on Microwave Theory and Techniques, vol. 49, No. 10, Oct. 2001.
H. Nakajima, "Demodulation of Multi-Gigahertz Frequency-Modulated Optical Signals in an Injection-Locked Distributed Feedback Laser Oscillator," Electronics Letters, vol. 26, No. 15, Jul. 19, 1990, pp. 1129-1131.
Nakajima et al. "Direct Demodulation of 140 Mb/s FSK Signals in an Injection-Locked Multiquantum-Well DFB Laser," IEEE Transactions Photonics Technology Letters, vol. 3, No. 11, Nov. 1991, pp. 1029-1031.

(Continued)

*Primary Examiner*—Leslie Pascal
(74) *Attorney, Agent, or Firm*—Buchanan Ingersoll & Rooney PC

(57) ABSTRACT

Disclosed is a Photonic Phase Locked Loop (PPLL) detector/discriminator, which makes possible a system for optically transmitting electromagnetic signals through a transmission medium (such as optical fiber, optical waveguide, underwater, in biological tissue, or in free space) with high sensitivity and extremely high dynamic range exceeding what is possible with present optical intensity modulated (AM) systems. Information is encoded on an optical carrier through the use of phase modulation (PM) or frequency modulation (FM). This information is subsequently demodulated into an accessible form through the use of the PPLL.

7 Claims, 7 Drawing Sheets

OTHER PUBLICATIONS

Chen et al., "Frequency Discriminator Based on Ring-Assisted Fiber Sagnac Filter," IEEE Photonics Technology Letters, vol. 17, No. 1, Jan. 2005, pp. 109-111.

Xie, X. B. et al., "Suppressed-Carrier Large-Dynamic-Range Heterodyned Microwave Fiber-Optic Link," Proceedings on IEEE International Topical Meeting on Microwave Photonics, Oct. 4-6, 2004, pp. 245-248.

John J. Degnan, "Optimization of Passively Q-Switched Lasers," IEEE Journal of Quantum Electronics, vol. 31, No. 11, Nov. 1995, pp. 1890-1901.

* cited by examiner

Third order intermodulation

PHOTONIC PHASE LOCKED LOOP DETECTOR/DISCRIMINATOR

FIELD OF THE INVENTION

The present disclosure relates to information bearing systems (such as radar or communications), and more particularly, to the demodulation of optical phase or frequency (as opposed to intensity) modulated signals of high quality.

BACKGROUND OF THE INVENTION

Most optical links at present employ intensity modulation and direct detection. Due to the inherent nonlinearity inside the optical intensity modulation process, such links suffer from high nonlinear distortion, which leads to limited dynamic range. The state-of-the-art spurious free dynamic range, or SFDR, is currently limited to 115 dB·Hz$^{2/3}$. This level of performance has been achieved by either linearizing the optical modulator or introducing pre-distortion.

Modern systems architectures often require the ability to 'remote' selected components from each other. For example, components such as sensors and the central processing unit (CPU), or the control unit and the phased array antenna are often not co-located. A data link provides the required connectivity that enables data flow between such components, becoming inadvertently an integral part of the system, and potentially a system performance limiting factor. Continued and ongoing research and development (R&D) efforts focus today on data links with higher dynamic range, higher data rates and bandwidth, and lower noise with an intent of making such links 'transparent', i.e., virtually unaffecting, largely 'invisible' to the primary system. Optical data links where the data is modulated on an optical carrier emanating from a source such as a laser and transmitted in either free space or in an optical medium (such as optical fiber or waveguide), are most commonly used.

In the current state-of-the-art, the data (in the form of electromagnetic signals) modulates the intensity of the optical carrier emanating from a laser source, travels along the optical link and is converted back to electromagnetic signals at the optical detector. The subsequent signal demodulation is done directly, typically through the use of a photo-mixer (such as a photodetector). One of the bottlenecks in such an optical link is the limited spurious free dynamic range (SFDR) due to the nonlinear distortion incurred within the modulation/demodulation processes. The current state-of-the-art manages to achieve SFDR in the range of 115 dB·Hz$^{2/3}$ by linearizing optical modulators, linearizing photodiodes, or introducing pre-distortion. However, some of the critical applications, such as antenna remoting, require an SFDR of at least an order of magnitude higher, for optimal performance. It is for such applications that high quality angle modulated optical links (made possible by the PPLL device disclosed herein) can play a role.

Angle modulation, of which FM and PM are subsets, refers to the variation of the phase angle of a carrier signal in proportion to an information signal. FM is the modulation of the instantaneous frequency, which can be related to PM by defining the instantaneous frequency to be the time derivative of the phase. In traditional electronic systems, angle modulation has been preferred over amplitude modulation (AM) for several reasons, including greater immunity from noise and static, and the ability to improve the signal to noise ratio (SNR) by sacrificing additional bandwidth. Electronic systems employing angle modulation have enjoyed strong success due to these advantages.

However, these benefits are even more attractive in the optical domain for a variety of reasons. Modern optical communication systems using intensity modulation (essentially a variant of AM) suffer from relatively poor system link performance compared to purely electronic counterparts. Furthermore, the extremely high operating frequencies of optical carriers (at several orders of magnitude above microwave systems) make bandwidth an abundant resource which can be used to advantage.

Optical phase and frequency modulation has been demonstrated using a variety of techniques. In general, modulation techniques can be categorized as either being external to the optical source, or inside the optical source itself. These techniques include, but are not limited to, the use of laser free spectral range tuning elements and modulation of the optical path.

In electrical FM (and PM) systems, signal demodulation is normally achieved by either directly converting the frequency information back into amplitude (through the use of a frequency discriminator), or by using a second frequency modulating element inside of a control loop to indirectly generate a signal that appears similar to the original information. Note that most frequency discrimination techniques assume that the amplitude of the FM signal is constant. Thus, fluctuations of the amplitude (e.g., through static or noise) will distort the demodulated signal. Therefore, most electronic discriminators are preceded by amplitude limiters.

A simple example of a frequency discriminator would be the use of a differentiator circuit, followed by an envelope detection circuit. FM signals which are passed through a differentiator circuit (such as a simple CR differentiator, which consists of a capacitor and resistor) will be amplitude modulated in proportion to their frequency. An envelope detection circuit will then remove the frequency information, and give an output signal that is proportional to the original information.

A related FM demodulation technique is the slope detector frequency demodulator. In this technique, a filter whose transition band falls within the bandwidth of the FM signal is used. If the filter frequency response is a fairly linear function of frequency, the ensuing amplitude of the output will also be linearly proportional to the information signal. The linearity of this approach can be improved by subtracting the falling edge of a bandpass element from the falling edge of a band reject element, as is done in the case of a triple-tuned discriminator.

Another frequency demodulator is the Foster-Seeley circuit, which is tuned to the carrier frequency of the FM signal. Two complementary sub-circuits are tuned such that when the input is at the resonant frequency, the outputs of the sub-circuits cancel each other. The circuits exploit the linear phase response of circuits near resonance. Thus, when the carrier frequency is modulated away from the resonant frequency, there is a corresponding phase change which causes the sum of the sub-circuits to no longer completely cancel out. In effect, another frequency-to-amplitude conversion has been made.

A similar demodulator that was popular in radio systems of the past is the ratio detector. However, instead of using two diodes in opposing polarity to cancel each other, the diodes are placed in series. Ratio detectors were popular for their hardiness against amplitude noise, owing to the use of large capacitive elements to smooth out high frequency fluctuations. Nevertheless, this type of system has fallen out of disfavor due to the need for transformer elements.

The linear phase response of near-resonant circuits is also integral to the operation of quadrature detectors, which are still used today. The output signal is split, and one of the halves is put in quadrature (shifted in phase by 90 degrees) and passed through a resonant circuit. The two signals are then put in a frequency mixer, which is a nonlinear multiplication element. The mixed signal has an amplitude which is dependent on the frequency deviation (since this frequency deviation produces a nearly linear phase change in the resonant circuit), once again performing an FM-to-AM conversion.

Another commonly used system is the time delay discriminator. This system simply splits the signal and slightly delays one of the halves. The two are then recombined. If the delay between the paths is very small relative to the length of the paths themselves, the result is once again analogous to a differentiator, and may be handled as such.

Alternatively, instead of differentiating the FM signal, the zero crossings of the signal can be counted instead. At higher frequencies, the FM signal amplitude will be zero more often than at lower frequencies. Through the use of a monostable pulse generator, a pulse will be produced at each zero crossing of the FM signal. Integrating these pulses yields an output which is proportional to the original information.

The phase-locked loop (PLL) is popular in high quality FM systems. It is an indirect method of demodulating FM signals, in that the loop is designed so that a voltage controlled oscillator (VCO) inside the loop tracks the frequency of a locking master signal. The generation of an error voltage which is proportional to the original signal is a consequence of this locking mechanism.

Typically, the input signal to a PLL is introduced to a phase comparator element, which generates an error voltage whose amplitude is proportional to the phase difference between the input and a VCO. The error voltage is then applied to the VCO, whose frequency is adjusted in proportion to the voltage amplitude. This forces the phase and frequency of the VCO inside the loop to be continuously synchronized to the original.

A variant of the PLL used for FM demodulation is the FM demodulator with feedback (FMFB). Instead of a phase comparator, the FMFB uses a frequency mixer, filter, and discriminator.

Similar progress in optical (as opposed to electronic) links has been somewhat slow. The predominant method to date involves direct modulation of the optical intensity to transmit information. This is done even when the original signal is angle modulated or digitally keyed, by intensity modulating the optical carrier with the entire electronic spectrum, in a process known as sub-carrier modulation (SCM). Quality and performance suffers in these approaches, in terms of spurious free dynamic range (SFDR), insertion loss, and noise figure (NF). The advantage is the conceptual simplicity of direct intensity modulation at the transmitter and receiver, as well as low number of components (and therefore, low cost).

To date, some basic research has been conducted in the use of optical angle modulation as an alternative transmission scheme. Nakajima has demonstrated FM and FSK (i.e., digital information encoded through the use of FM) demodulators by using injection locking of distributed feedback (DFB) lasers. Nakajima, H., "Demodulation of multi-gigahertz frequency-modulated optical signals in an injection-locked distributed feedback laser oscillator," *Electronics Letters*, vol. 26, no. 15, Jul. 19, 1990, pp. 1129-1131 Nakajima et al., "Direct demodulation of 140 Mb/s FSK signals in an injection-locked multiquantum-well DFB laser," *IEEE Photonics Technology Letters*, vol. 3, no. 11, November 1991, pp. 1029-1031. The demodulator relies on a laser which is injection locked to the optical signal from the transmitter. It performs an FM-to-AM conversion because the quasi-Fermi level separation inside the DFB laser is a function of the frequency detuning of the injected frequency. Thus, as the optical injection frequency is detuned from the locking frequency center, there is a measurable electrical voltage change across the laser device. More recently, Chen, et al. have shown an optical FM discriminator, where demodulation is performed with an optical analogue of a slope detection circuit. Chen et al., "Frequency Discriminator Based on Ring-Assisted Fiber Sagnac Filter," *IEEE Photonics Technology Letters*, vol. 17, no. 1, January 2005, pp. 109-111. However, both of these approaches cannot capitalize on the advantages of optical FM links, because the demodulation schemes each require a preliminary FM-to-AM conversion in order to recover the original information. Thus, both schemes are inherently limited by the same ultimate deficiencies as the ubiquitous direct intensity modulation schemes, which are already AM approaches.

Since it is an improvement of electronic PLL demodulation, which is an indirect method, angular demodulation using the PPLL does not suffer from this limitation and is capable of supporting links that have high dynamic range, low insertion loss, low noise figure, and high linearity. Although other schemes to directly perform angular demodulation in the optical domain have previously been implemented, their limitations have not allowed them to achieve performance that significantly surpasses the current state-of-the-art intensity modulated, direct detection optical link.

The proposed invention relates to an alternative type of optical link employing coherent optical angular modulation (as opposed to intensity modulation), now made possible as a superior alternative to intensity modulated links by a fundamentally new, intrinsically linear photonic PLL (PPLL) discriminator (as opposed to an incrementally new linearization technique). The invention being disclosed presents the concept and a design of this novel Photonic PLL enabling FM or PM signal demodulation in the optical domain, resulting in a significant performance improvement of the optical link, and more specifically, improvement of its dynamic range (with SFDR typically exceeding 150 dB·Hz$^{2/3}$).

The novel PPLL demodulator disclosed here makes a high quality, angle modulated optical link (with performance surpassing intensity modulated links) possible for the first time. A microwave fiber link employing such a PPLL demodulator is able to yield an SFDR larger than 160 dB·Hz$^{2/3}$

SUMMARY OF THE INVENTION

The principal concern of this invention is a high performance optical link and related components for the transmission of electromagnetic signals. The link uses a frequency modulation (FM) and/or phase modulation (PM) scheme as opposed to more conventional amplitude modulation (AM) approaches. The function of the link is to transmit an information signal transparently, with minimum distortion from one point to another via an optical carrier. The FM or PM modulation scheme offers a higher quality link particularly in terms of dynamic range and sensitivity, which are the principal driving forces behind the innovation. Main applications of the link include antenna remoting for radar and communications, coherent optical communication links, advanced fiber radio systems, medical diagnostics, and remote sensing.

The primary component that makes the high performance FM or PM optical link a possibility is the Photonic Phase Locked Loop (PPLL). In subsequent paragraphs the operation and expected performance of the PPLL, the key device attributes, and the requirements for optimal link performance will all be discussed.

The link is comprised of an optical transmitter/source, a transmission channel/medium, and an optical receiver/demodulator. The preferred structure for optimal link performance of the transmitter is the electro-optic microchip laser, which consists of a high quality solid-state microchip laser and internal modulator integrated within the same optical cavity. This device provides for high bandwidth, linear frequency modulation with extremely low phase noise, narrow linewidth, and low relative intensity noise (RIN). The laser technology is covered in U.S. Pat. No. 6,654,401 to Cavalheiro Vieira et al for "Multiple laser source, and systems for use thereof".

The key to the high performance of the link is the PPLL-based optical receiver disclosed in this document. The photonic implementation of the conventional PLL provides for large bandwidth that is not possible with purely electronic PLLs. Furthermore, the PPLL provides for a high degree of linearity that is not achievable with conventional FM discriminators. The PPLL has three critical elements: a photo-mixer (such as a photodetector), a loop filter, and a local laser oscillator/modulator (which may be similar to the one used in the optical transmitter).

DETAILED DESCRIPTION OF THE INVENTION

Highly linear optical frequency modulation (FM) or phase modulation (PM) can be employed to obtain a high dynamic range optical link. Such a link conveys electromagnetic signals from a transmitter to a receiver. Optical FM and PM modulators with high linearity have already been realized, but optical demodulators of similar quality have not. Therefore, the critical component which must be innovated in order to implement the next generation of links is a highly linear optical FM or PM demodulator. An integrated photonic phase locked loop (PPLL) can fit such a need.

The photonic phase locked loop (PPLL) as the optical frequency/phase demodulator is the key element in the high dynamic range optical link. The phase detector (photo-mixer) senses the phase difference between the input optical wave and the output from the local oscillator (LO) laser. Via a loop filter, the phase difference is subsequently fed back to frequency modulate the LO laser. Ideally, if the PPLL has infinite gain, the output from the LO laser and the input wave will have identical optical phases, and hence identical instantaneous frequencies. This implies the PPLL demodulator output (i.e., the voltage signal across the LO laser) must be a faithful copy of the original transmitted signal. In practice, the PPLL has finite loop gain. Accordingly, a small but finite phase difference between the two optical waves exists. Since the phase detector inside the PPLL has a sinusoidal response to the optical phase, any phase difference will introduce nonlinear distortion and limit the highest signal level. In addition, various noise sources from optical or electronic devices set a link noise floor (or minimum detectable signal level). The nonlinear distortion and the noise floor determine the spurious free dynamic range (SFDR).

Figure 1:
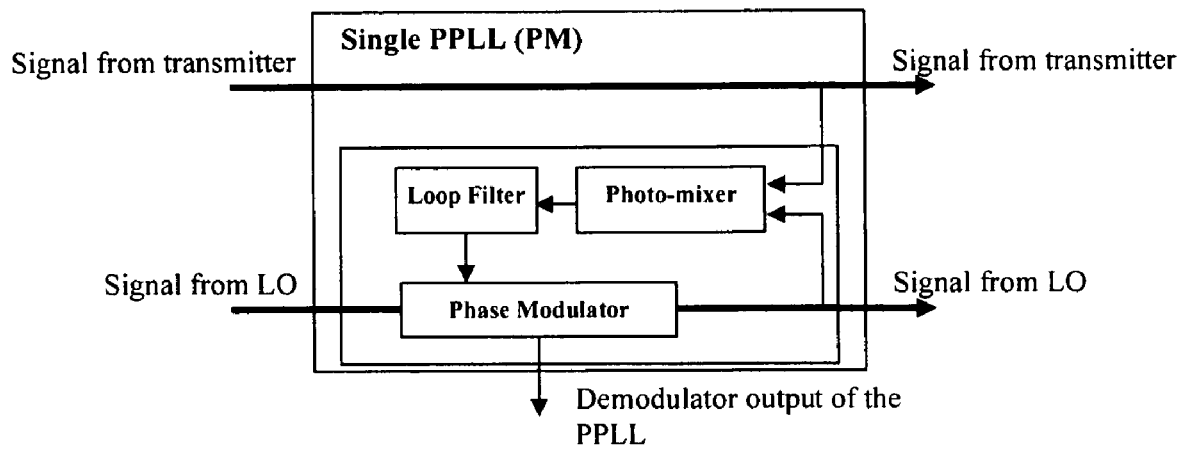
FIG. 1 is a simplified block diagram of a single stage Photonic Phase Locked Loop for use as a demodulator in an optical PM link.

FIG. 1 is a simplified diagram of a PPLL for phase demodulation according to one aspect of the inventions. In FIG. 1, a fraction of the signal from the transmitter and the signal from the local oscillator (LO) are fed into a photo-mixer. Under the small angle approximation, the output of the photo-mixer is the phase difference between the two signals. In its simplest form, the photo-mixer can consist of a single high speed photodiode. In such an implementation, a constant DC current proportional to the optical power also appears at its output. This DC current can be compensated for by a bias network. An alternative implementation of the photo-mixer is a pair of photodiodes in a balanced configuration. In this case, only the phase difference exists. The loop filter that follows the photo-mixer modifies the amplitude and spectral shape of the phase error signal in order to maximize the feedback gain while maintaining loop stability. Via the correction provided by the loop filter, the phase error signal is subsequently applied to an optical phase modulator to correct the phase difference between the signals from the transmitter and the LO. Thus, the feedback loop is closed.

Figure 2:
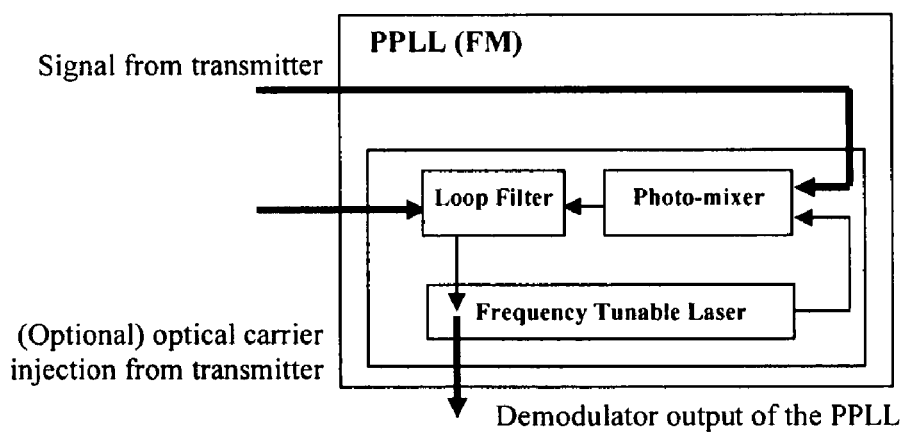
FIG. 2 is a block diagram of an alternative PPLL demodulator using a frequency tunable laser local oscillator, suitable for use as a demodulator in an optical FM link.

FIG. 2 shows an alternative embodiment of the PPLL for frequency demodulation, which employs a frequency tunable laser in place of the phase modulator, and is used in an optical FM link. This PPLL behaves in a manner similar to the previous PPLL embodiment for phase demodulation. A frequency modulated optical signal and the output from a frequency tunable laser are mixed in the photo-mixer, which detects the phase difference between the two optical signals. The error signal is later applied to the frequency tunable laser via a loop filter. Assuming the feedback gain is infinite, the two optical signals will acquire identical phase, and therefore identical frequency. Thus, the voltage across the tunable laser of the PPLL will correspond to an ideal FM demodulation output. Like the PPLL for phase demodulation, when the PPLL has finite gain, nonlinear distortion may occur. In addition, a fraction of the transmitting signal can be seeded to the tunable laser to carry out injection locking, which greatly facilitates the PPLL initial acquisition process. Depending on the application, it may be desirable to optically filter the modulation sideband of the seeding signal.

Figure 3:
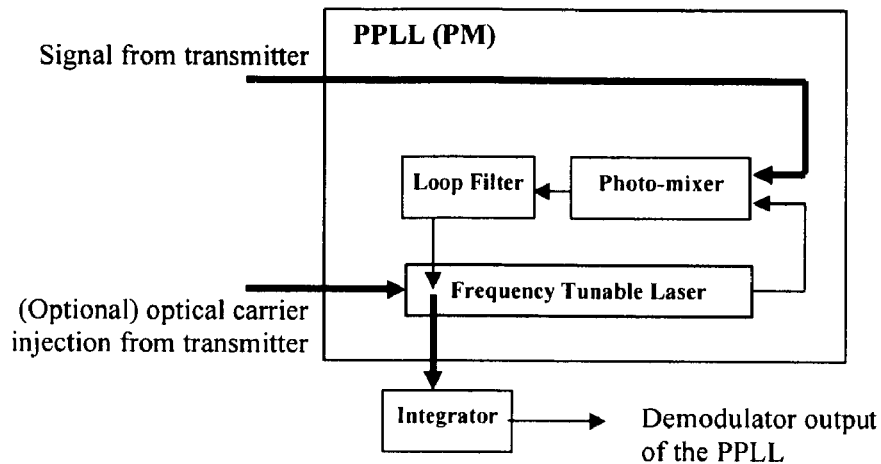
FIG. 3 is a block diagram of an alternative PPLL demodulator using a frequency tunable laser local oscillator and integrator, suitable for use as a demodulator in an optical PM link.

Since the optical frequency is the time derivative of the optical phase, another alternative embodiment can be realized, as shown in FIG. 3. Here, an integrator is placed after a PPLL employing frequency tunable laser in order to perform highly linear phase demodulation. The integrator can be implemented in a variety of well-established ways (e.g., with a simple RC circuit).

Figure 4:
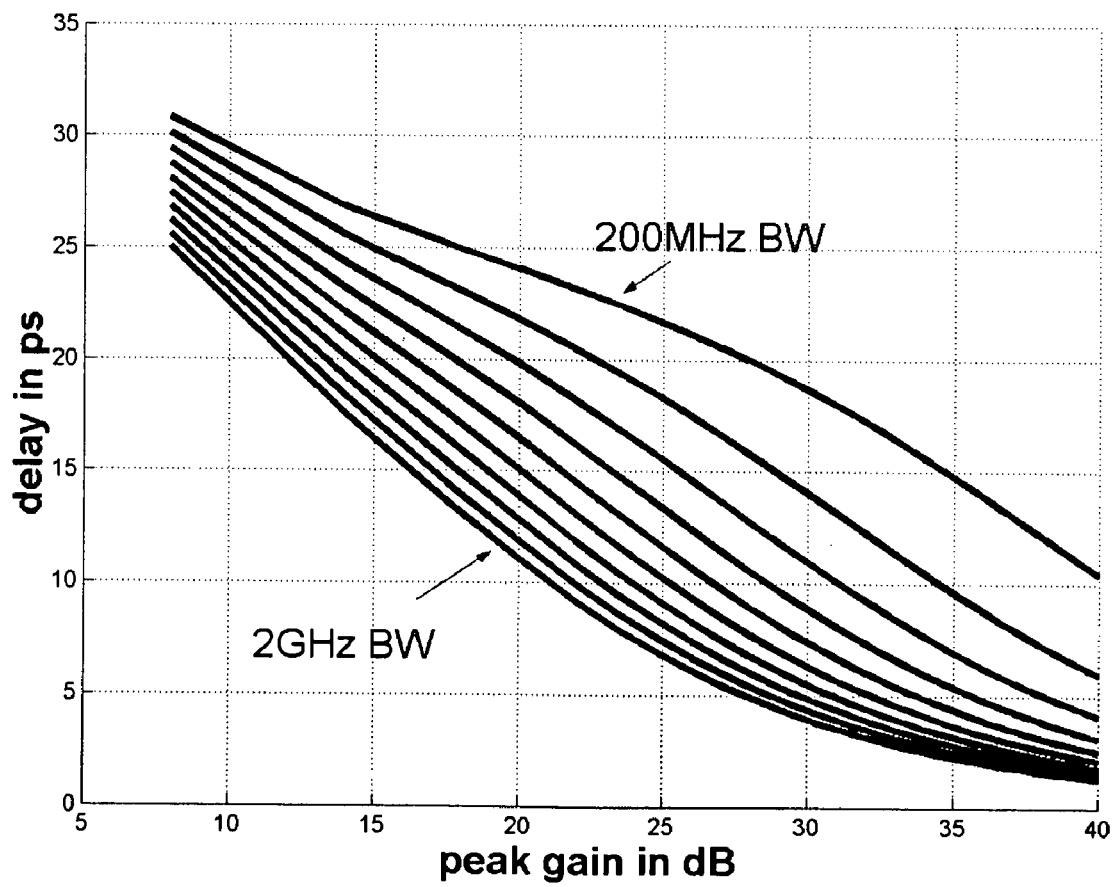
FIG. 4 shows the maximum loop delay as a function of PPLL feedback gain and bandwidth assuming the microwave frequency is 10 GHz and a simple tank circuit is used for the loop filter.

High feedback gain is necessary for a highly linear PPLL receiver (FIGS. 1, 2, and 3). The biggest obstacle in achieving a high feedback gain at high frequencies is minimizing the PPLL loop propagation delay to meet stability requirements. FIG. 4 shows the maximum tolerable propagation delay as a function of feedback gain and the bandwidth when the microwave frequency is set to 10 GHz and a simple tank loop filter is selected. The tolerable delay decreases monotonically as the gain and the bandwidth increase. To achieve 20 dB gain and a bandwidth of 2 GHz, the PPLL propagation delay must be less than 10 ps. This requires chip level integration of the PPLL components. However, due to finite device dimensions and processing difficulties, there is a practical limit to the delay time which must be considered when designing the PPLL for high frequency applications requiring extremely high linearity (and a correspondingly large feedback gain). In those cases, a distributed PPLL receiver (FIG. 5) is an appropriate solution.

Figure 5:
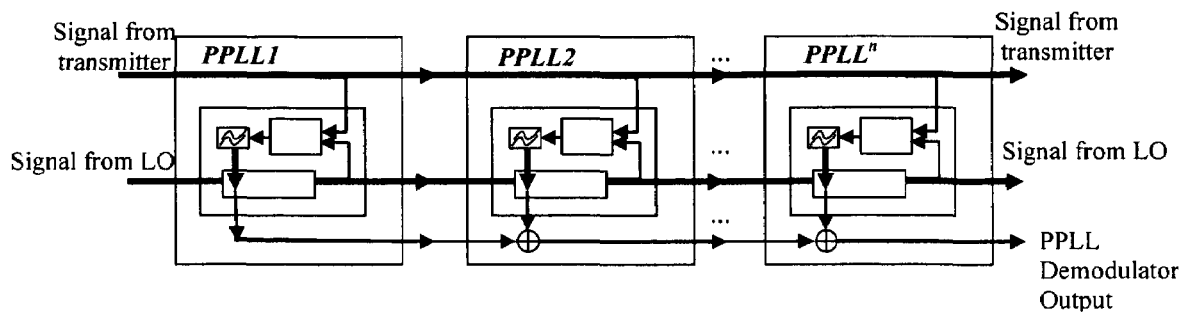
FIG. 5 is a simplified block diagram of a multiple stage demodulator implementing the Photonic Phase Locked Loop of FIG. 1, for high dynamic range operation and enhanced overall performance.

FIG. 5 is a diagram for a distributed PPLL receiver, which contains a cascade of individual PPLL elements employing external phase modulators. In FIG. 5, each stage takes the optical outputs from the previous PPLL stages as its inputs. Because of the feedback control, the optical phase difference between the transmitter signal and LO signal is reduced by each stage. Mathematically, the phase difference at the input and the phase difference at the output is related by: $\Delta\theta_k = \Delta\theta_{k-1}/(1+G_k)$, where $\Delta\theta_k$ and $G_k$ are the phase difference at the output and the feedback gain of the $k^{th}$ stage, respectively. When the stages are cascaded, the optical phase difference at the end of the distributed PPLL receiver becomes:

$$\Delta\theta_n = \Delta\theta_0 \bigg/ \prod_{k=1}^{n}(1+G_k),$$

where $\Delta\theta_0$ is the initial phase difference, or the phase modulation occurred in the transmitter. Thus, for a distributed PPLL receiver, the effective feedback gain is a multiplication of the gain of each stage, or $$\prod_{k=1}^{n}(1+G_k).$$

Therefore, although each stage may not have high gain, a very high feedback gain can be achieved by cascading several stages. Since the demodulation linearity depends on feedback gain, an ultra-linear phase demodulator can be implemented using the distributed PPLL. With regards to the signal demodulation, each PPLL stage in FIG. 5 corrects nonlinear distortion caused by the previous elements. The demodulator output is a summation of the loop filter output of each PPLL elements. In addition, in FIG. 5, the transmitter signal, LO signal and PPLL demodulator signal should be velocity matched to minimize unwanted propagation effects.

Figure 6:
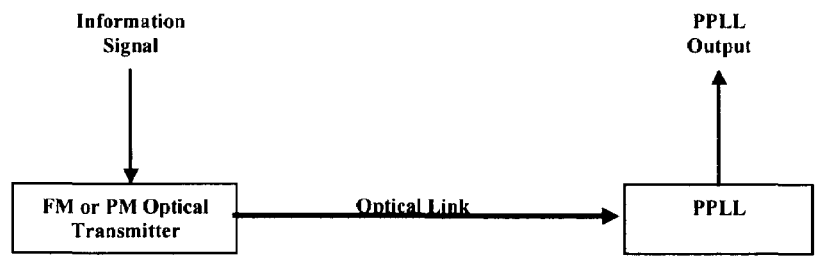
FIG. 6 is a simplified block diagram of an FM fiber radio link for antenna remoting application, in which the PPLL demodulator of FIG. 1 is used to recover the original information.

FIG. 6 shows a generic overview of a high dynamic range, highly sensitive optical link using either optical PM or FM. First, an electromagnetic information signal modulates the optical phase (or frequency) of the optical carrier generated by the transmitter. The information is therefore embedded inside the optical carrier phase (or frequency). The output of the optical transmitter travels to a receiver through a channel, which could be an optical fiber, free space, or other medium. On the receiver side, a highly linear PPLL senses the optical signal and faithfully recovers the information. Using the small signal, additive noise model, the link response, noise figure, and dynamic range of such a link can be found to be:

Link response:

$$V_{so} = \frac{G}{1+G} \cdot \frac{\alpha_1}{\alpha_2} V_{si} \approx \frac{\alpha_1}{\alpha_2} V_{si}$$

Noise figure:

$$NF = 20 \cdot \log_{10}\left(\frac{\omega}{\alpha_1}\sqrt{\frac{\frac{P_1}{P_2}RIN_1 + \frac{P_2}{P_1}RIN_2 + \frac{8\cdot(1/P_1 + 1/P_2)\cdot e/2}{k_{pd}} + \delta\theta_{1n}^2 + \delta\theta_{2n}^2 + \frac{4KT}{k_{pd}^2 P_1 P_2 R}}{4KTR}}\right)$$

Spurious free dynamic range:

$$SFDR = 2/3 \cdot 20 \cdot \log\left\{\frac{[24\cdot(G+1)^3]^{1/2}}{\sqrt{\frac{P_1}{P_2}RIN_1 + \frac{P_2}{P_1}RIN_2 + \frac{8\cdot(1/P_1+1/P_2)\cdot e/2}{k_{pd}} + \delta\theta_{1n}^2 + \delta\theta_{2n}^2 + \frac{4KT}{k_{pd}^2 P_1 P_2 R}}}\right\}$$

where $\alpha_1$ and $\alpha_2$ are the FM sensitivity of the transmitter and the LO lasers, respectively. In the case where a phase modulator is used, the effective FM sensitivity of the phase modulator is given by: $\alpha = \beta \cdot \omega$, where $\beta$ is the PM sensitivity of the phase modulator and $\omega$ is the modulation frequency. $V_{so}$ and $V_{si}$ are the PPLL demodulator output and the link input signals, respectively; $G(s)$ is the PPLL open loop gain; $P_{1(2)}$ is the optical power of the transmitter laser (LO laser); and $RIN_{1(2)}$ and $\delta\theta_{1n(2n)}$ and are the RIN noise and the phase noise of the transmitter (LO) laser, respectively. Also, e is the electron charge, $k_{pd}$ is the photodiode responsivity, K is the Boltzmann constant, T is the system temperature, and R is the termination impedance.

Figure 7:
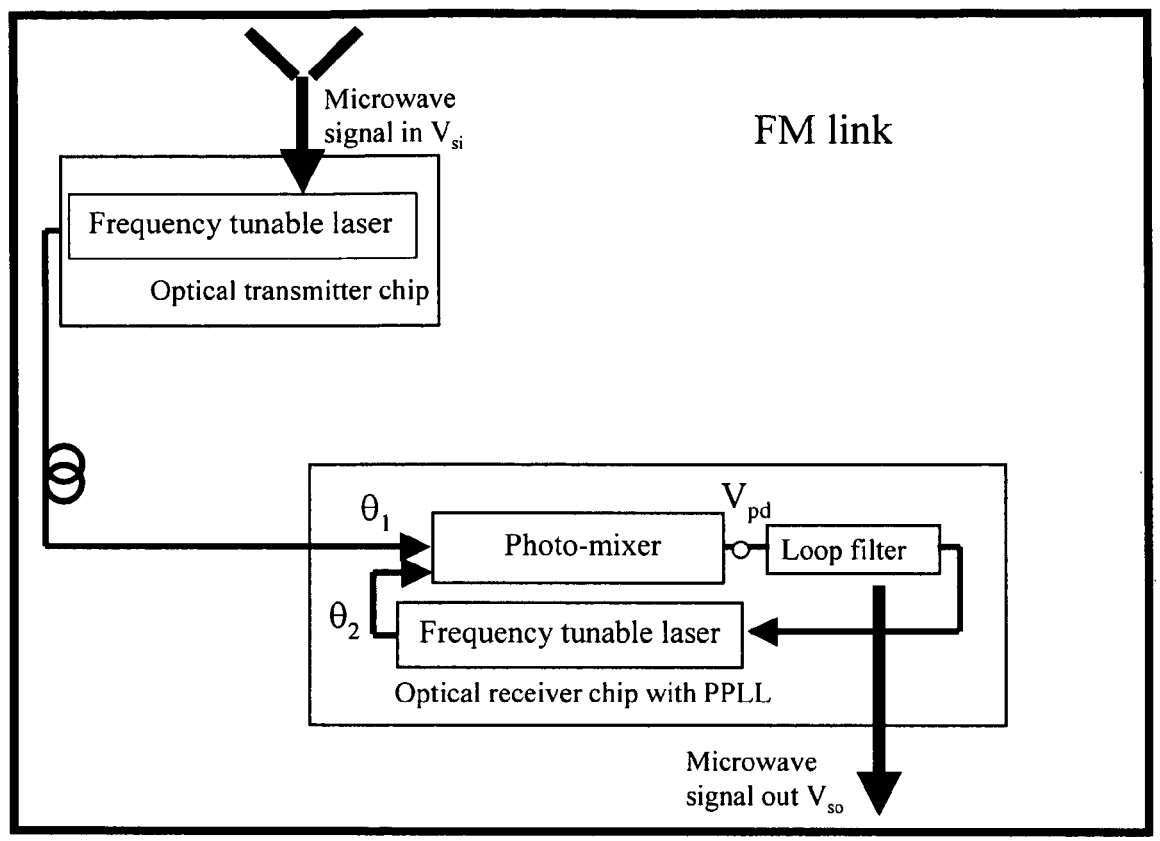
FIG. 7 is a block diagram of an FM fiber radio link for antenna remoting application, in which a tunable laser is used for the transmitter and the PPLL demodulator of FIG. 2 is used to recover the original information.

For a high dynamic range optical link, the important parameters are: 1) FM sensitivity of the transmitter laser, which determines the link noise figure, and 2) the PPLL feedback gain, which determines the link SFDR. For applications that demand high dynamic range and moderate link noise figure, it is suitable to use tunable laser inside the transmitter and a PPLL for frequency demodulation, as suggested in FIG. 7. This is advantageous because tunable lasers have resonant cavities, and thus they yield higher FM sensitivity for short device dimension. In certain applications, such as antenna remoting, it is desirable to feed the antenna signal directly into the optical link without active amplification. This generally necessitates a link noise figure better than 3 dB, which according to theoretical calculations requires an FM sensitivity in excess of 100 GHz/volt. This level is difficult to obtain (if not impossible) inside traditional electronic PLLs, and illustrates why the PPLL is a novel advancement. Such sensitivity can be obtained by tunable laser diodes or by employing external optical phase modulation. On the other hand, the key to achieving high dynamic range is to have a high PPLL open loop gain. In order to obtain a SFDR of 160 dB·Hz$^{2/3}$, a feedback gain of more than 20 dB is required at microwave frequencies. This is a technological challenge since such a high feedback gain at the high frequency range may compromise PLL stability. The key is to minimize the loop delay. For example, in order to achieve 20 dB gain at 10 GHz with a bandwidth of 2 GHz, the maximum loop delay must be less than 10 ps, which requires the device dimension to be less than 1 mm. This requires a dense integration of all components of the PPLL.

Figure 8:
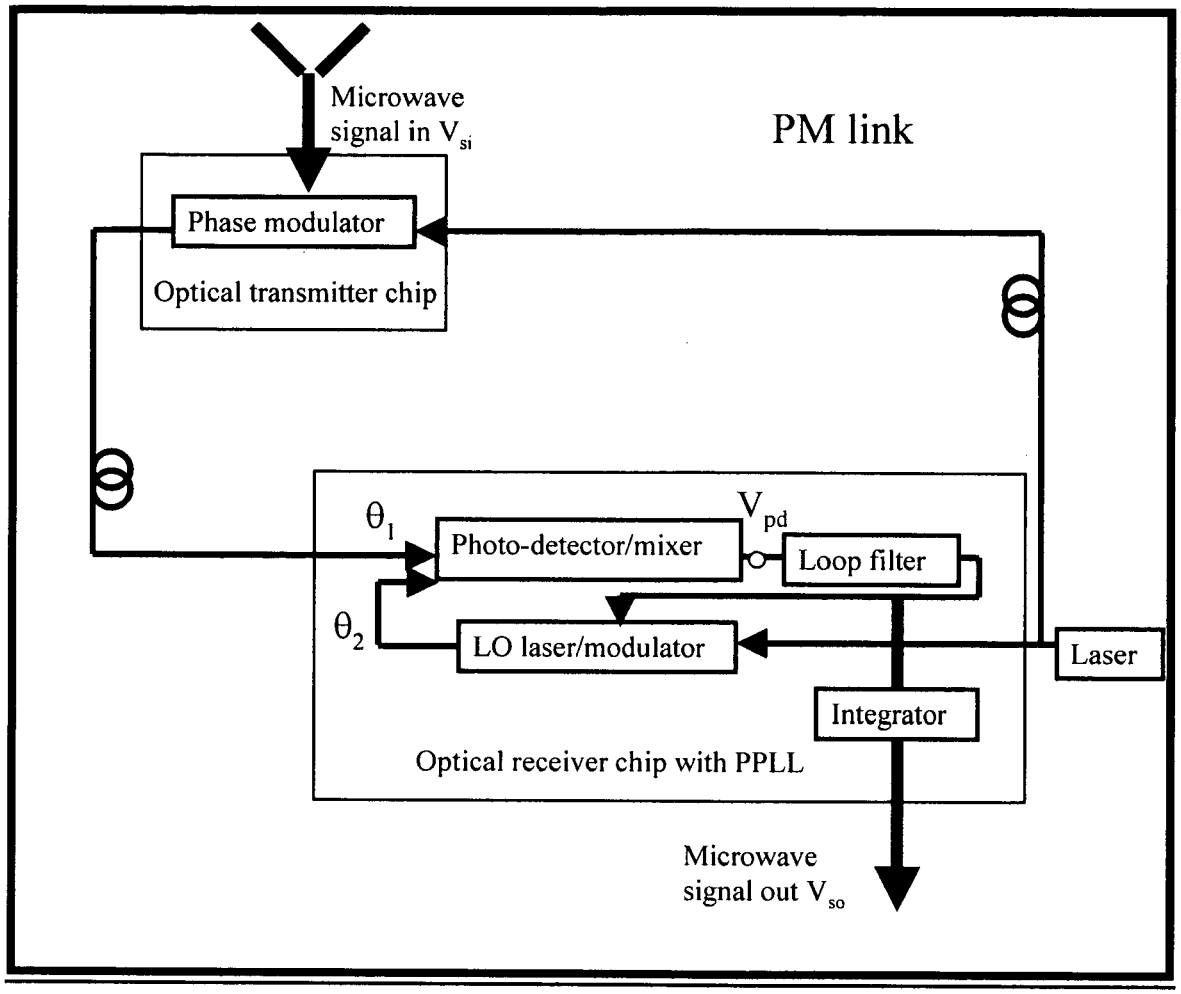
FIG. 8 is a block diagram of a PM fiber radio link for antenna remoting application, in which a phase modulator is used for the transmitter and a PPLL demodulator with a tunable laser is used to recover the original information.
Figure 9A:
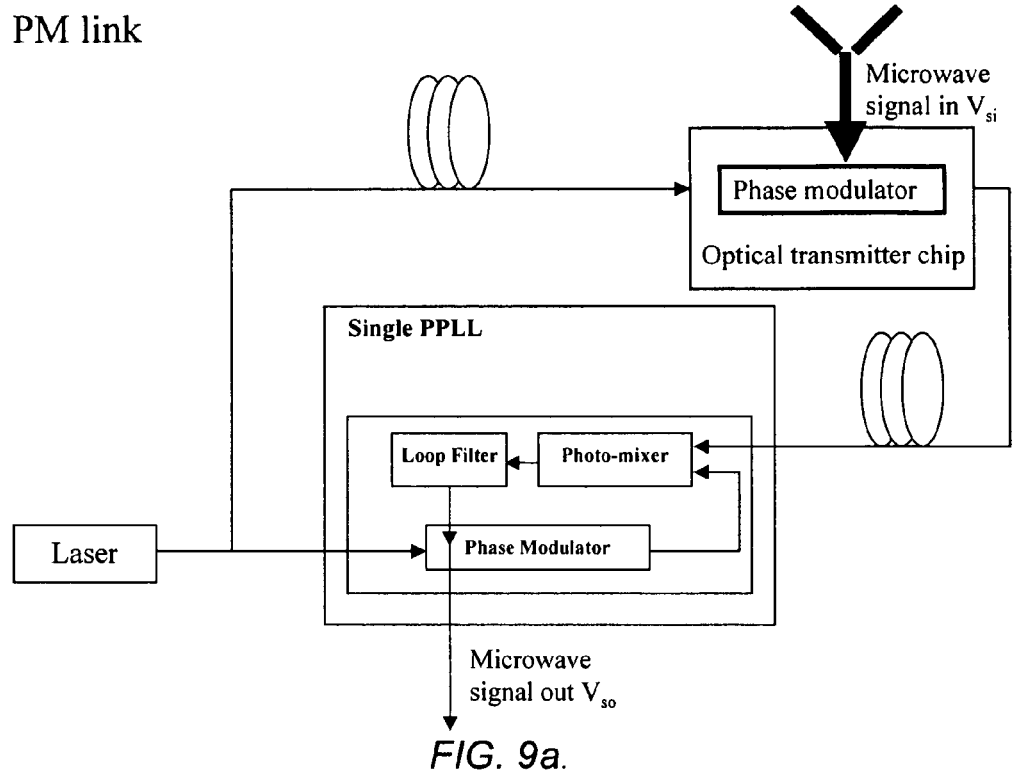
FIG. 9a is a block diagram of an PM fiber radio link for antenna remoting application, in which a phase modulator is used for the transmitter and the PPLL demodulator of FIG. 1 is used to recover the original information.

In applications, where only passive components are allowed inside the transmitter, an optical link employing an external phase modulator can be implemented. In this case, the optical phase is used to carry the information, i.e., the information signal. If extremely high dynamic range is not required, the receiver side of the link can be implemented either with a PPLL for frequency demodulation followed by an integration (e.g. a RC circuit) (see FIG. 8) or with a single PPLL for phase demodulation (see FIG. 9a). Comparing the two, FIG. 8 has a higher performance potential since the tunable laser inside the PPLL inherently has higher FM sensitivity, while FIG. 8 enjoys simplicity in device fabrication.

Figure 9B:
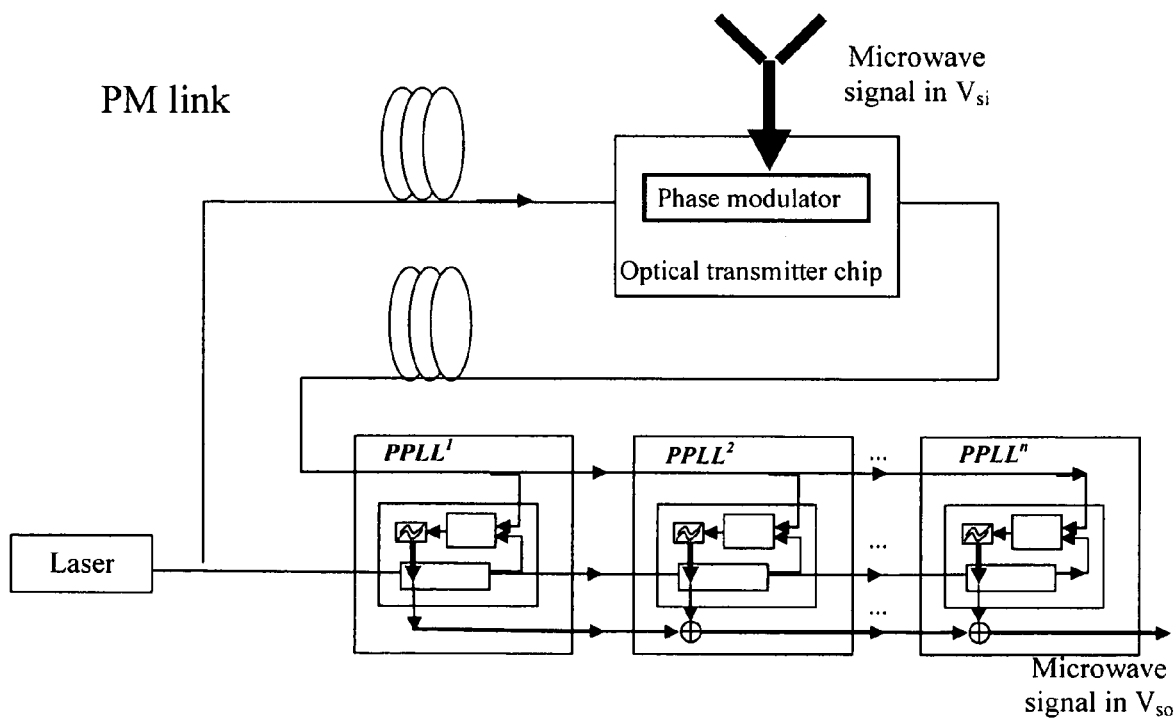
FIG. 9b is a block diagram of a PM fiber radio link for antenna remoting application, in which a phase modulator is used for the transmitter and the distributed PPLL demodulator of FIG. 4 is used to recover the original information.

For applications that demand extremely low noise figure and large dynamic range, an optical link using an external phase modulator and a distributed PPLL (see FIG. 9b) is an appropriate solution. The phase modulator sensitivity is proportional to the length of the device while the sensitivity of a tunable laser is independent of the cavity length. Although a short external phase modulator may be less sensitive than a tunable laser, its sensitivity can be increased by making the modulator longer. Thus, a long modulator can have much higher sensitivity than a tunable laser. On the transmitter side, a long modulator length can be tolerated since the there is no feedback control and the propagation delay in the transmitter does not affect the device performance. With high sensitivity, an extremely low noise figure can be obtained. On the receiver side, since the distributed PPLL is scalable (that is, its effective feedback gain is the multiplication of the feedback gain of each individual PPLL stage), the distributed PPLL can provide much higher feedback gain than a single PPLL employing frequency tunable laser if there are sufficient PPLL stages and the velocity match between the optical signal and output signal is maintained. With such a high feedback gain, the link shown in FIG. 9b can attain an extremely high dynamic range as well. However, a caveat to this approach is the complexity in device fabrication introduced by the additional stages.

From the foregoing description of various present preferred embodiments of our invention it should be apparent that we provide a method for transmitting data using optical signals that involves these steps:
1. Generating an optical carrier.
2. Modulating the frequency or phase of the optical carrier using the electromagnetic signal according to an original high dynamic range signal.
3. Transmitting the modulated optical carrier from a transmitter through a medium, and receiving the modulated optical carrier in a receiver.
4. Demodulating the frequency or phase information to reproduce the original high dynamic range signal in a new location.

The receiver comprises:
A Photonic Phase-Locked Loop (PPLL), which receives said modulated optical carrier and generates a high dynamic range electromagnetic signal proportional to the original high dynamic range electromagnetic signal in the transmitter, wherein said PPLL comprises:
A phase modulator, which modulates the optical frequency or phase of an optical signal operating as a Local Oscillator (LO), which may originate from the master laser,
A photo-detector device, which produces an electrical output over a given bandwidth in proportion to the irradiance of the optical input over a given range of wavelengths that is incident to said device, and
A loop filter which ensures high gain and stability of the PPLL.

Figure 10:
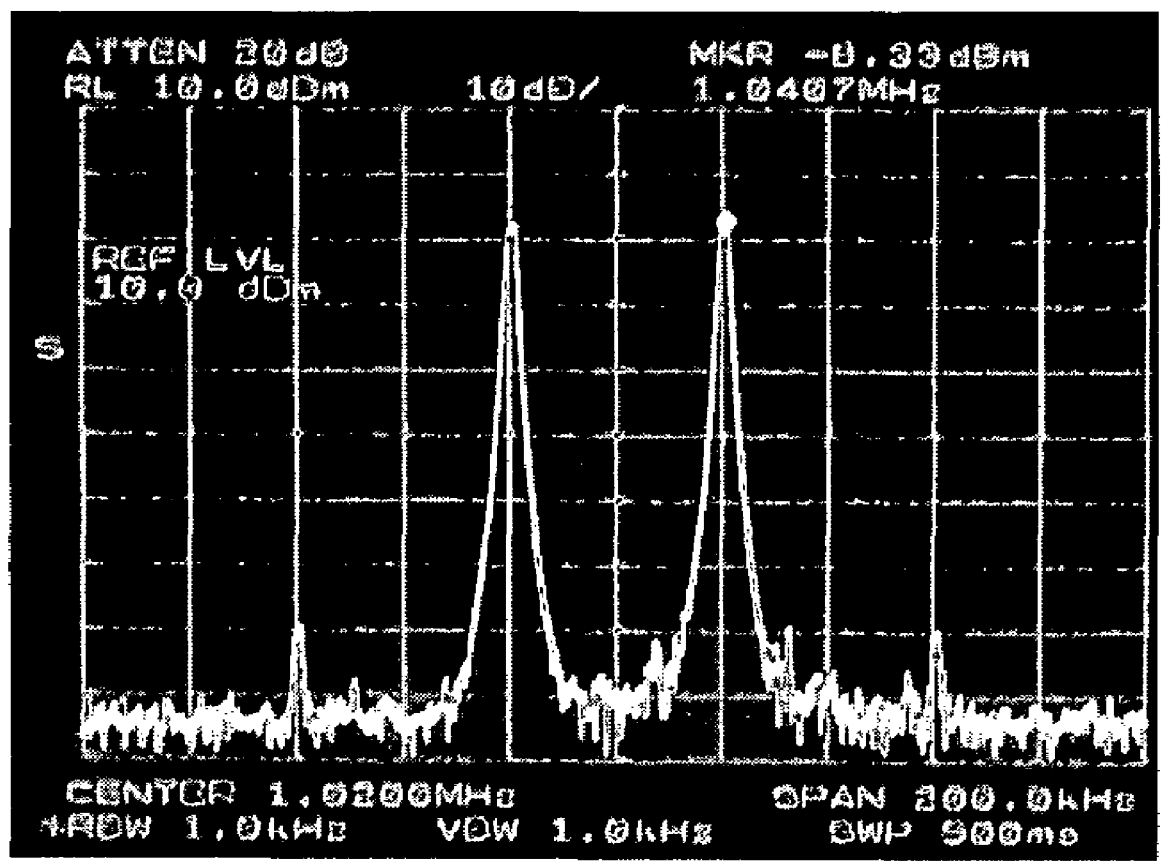
FIG. 10 is a display of the output of a PPLL mode in accordance with the present invention.

An evaluation PPLL was constructed according to FIG. 2, the PPLL employing a tunable laser. The PPLL feedback gain was designed to be 20 dB. At the link transmitter, a tunable laser was employed. The FM sensitivity of both lasers is 20 MHz/volt. Two inputs tones (3 dBm each, one at 1 MHz and the other at 1.04 MHz) were applied to the tunable laser. The output of the PPLL was monitored by a microwave spectrum analyzer, which captured the intermodulation, as shown in FIG. 10. The third order intercept point (IP3) for this specific case was found to be 23 dBm, or a voltage drop of 8.8 volt on the PPLL LO, which agrees with the predication of the model (8.9 volt).

Although we have described several devices that could be used to practice the method, those skilled in the art will recognize that other devices could be used.

What is claimed is:

1. A device for optically transmitting a high bandwidth electromagnetic signal with extremely high dynamic range and sensitivity, comprising:
an optical transmitter which modulates a phase of an optical carrier using the high bandwidth electromagnetic signal to form a modulated optical carrier connected to the optical transmitter;
a transmission medium through which an output of said transmitter is propagated; and
a receiver connected to the transmission medium which accepts said modulated optical carrier and demodulates phase information to reproduce the high bandwidth electromagnetic signal in a new location, wherein said receiver comprises,
a photonic phase-locked loop, which receives said modulated optical carrier, performs phase demodulation and generates a high dynamic range electromagnetic signal proportional to the original high bandwidth electromagnetic signal in the transmitter, wherein said photonic phase-locked loop comprises,
a phase modulator, which modulates an optical phase of an optical signal operating as a local oscillator, a photodetector device, which produces an electrical output over a given bandwidth in proportion to irradiance of an optical input over a given range of wavelengths that is incident to said device, and a loop filter which ensures high gain and stability of the photonic phase-locked loop.

2. A device as in claim 1, wherein the optical signal acting as local oscillator in the photonic phase-locked loop is generated by a different optical source from one in the transmitter.

3. A device as in claim 2, wherein the receiver is comprised of multiple photonic phase-locked loops cascaded together.

4. A device as in claim 1, wherein the receiver is comprised of multiple photonic phase-locked loops cascaded together.

5. A device as in claim 1 wherein the optical signal operating as a local oscillator originates from a master laser.

6. A method of optically transmitting a high bandwidth electromagnetic signal with extremely high dynamic range and sensitivity, comprising:

generating an optical carrier having a frequency and a phase;

modulating at least one of the frequency and the phase of the optical carrier using the electromagnetic signal according to an original high dynamic range signal to form a modulated optical carrier;

transmitting the modulated optical carrier from a transmitter through a medium, and receiving the modulated optical carrier in a receiver; and demodulating at least one of the frequency and the phase to reproduce the original high dynamic range signal in a new location;

wherein said receiver comprises:

a photonic phase-locked loop, which receives said modulated optical carrier, performs phase demodulation and generates a high dynamic range electromagnetic signal proportional to the original high dynamic range electromagnetic signal in the transmitter, wherein said photonic phase-locked loop comprises:

a phase modulator, which modulates at least one of optical frequency and phase of an optical signal operating as a local oscillator, a photo-detector device, which produces an electrical output over a given bandwidth in proportion to irradiance of the optical input over a given range of wavelengths that is incident to said device, and a loop filter which ensures high gain and stability of the photonic phase-locked loop.

7. A method of optically transmitting a high bandwidth electromagnetic signal with extremely high dynamic range and sensitivity, comprising:

generating an optical carrier having a frequency and a phase;

modulating at least one of the frequency and the phase of the optical carrier using the electromagnetic signal according to an original high dynamic range signal to form a modulated optical carrier;

transmitting the modulated optical carrier from a transmitter through a medium, and receiving the modulated optical carrier in a receiver; and demodulating at least one of the frequency and the phase to reproduce the original high dynamic range signal in a new location;

wherein said receiver comprises:

a photonic phase-locked loop, which receives said modulated optical carrier and generates a high dynamic range electromagnetic signal proportional to the original high dynamic range electromagnetic signal in the transmitter, wherein said photonic phase-locked loop comprises:

a phase modulator, which modulates at least one of optical frequency and phase of an optical signal operating as a local oscillator, a photo-detector device, which produces an electrical output over a given bandwidth in proportion to irradiance of the optical input over a given range of wavelengths that is incident to said device, and a loop filter which ensures high gain and stability of the photonic phase-locked loop; and wherein the optical signal operating as a local oscillator is a master laser.

* * * * *